(12) United States Patent
Gaddy

(10) Patent No.: US 8,712,095 B2
(45) Date of Patent: *Apr. 29, 2014

(54) DIGITAL PROCESSING METHOD AND SYSTEM FOR DETERMINATION OF OPTICAL FLOW

(71) Applicant: Spinella IP Holdings, Inc., Edison, NJ (US)

(72) Inventor: William L. Gaddy, Milford, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/905,592

(22) Filed: May 30, 2013

(65) Prior Publication Data

US 2013/0259317 A1 Oct. 3, 2013

Related U.S. Application Data

(63) Continuation of application No. 13/712,030, filed on Dec. 12, 2012, now Pat. No. 8,483,438, which is a continuation of application No. 12/555,472, filed on Sep. 8, 2009, now Pat. No. 8,355,534.

(60) Provisional application No. 61/105,515, filed on Oct. 15, 2008.

(51) Int. Cl.
*G06K 9/00* (2006.01)
*H04N 11/02* (2006.01)

(52) U.S. Cl.
USPC .................. 382/100; 382/274; 375/240.01

(58) Field of Classification Search
CPC ............ G06T 7/20; G06K 9/30; H04N 11/02
USPC ......... 382/100, 103, 106–107, 162, 168, 173, 382/181, 193–194, 199, 209, 224, 232, 240, 382/254–260, 274–276, 284–291, 305, 312, 382/321; 348/578; 375/240.12, 240.01
See application file for complete search history.

(56) References Cited

U.S. PATENT DOCUMENTS

| | | | | |
|---|---|---|---|---|
| 5,500,904 A | * | 3/1996 | Markandey et al. | 382/103 |
| 7,408,986 B2 | * | 8/2008 | Winder | 375/240.12 |
| 8,355,534 B2 | * | 1/2013 | Gaddy | 382/103 |
| 2004/0252759 A1 | * | 12/2004 | Winder et al. | 375/240.12 |
| 2007/0126932 A1 | * | 6/2007 | Bhat et al. | 348/578 |

* cited by examiner

*Primary Examiner* — Seyed Azarian
(74) *Attorney, Agent, or Firm* — Lowenstein Sandler LLP

(57) ABSTRACT

A method and system for determining an optical flow field between a pair of images is disclosed. Each of the pair of images is decomposed into image pyramids using a non-octave pyramid factor. The pair of decomposed images is transformed at a first pyramid scale to second derivative representations under an assumption that a brightness gradient of pixels in the pair of decomposed images is constant. Discrete-time derivatives of the second derivative image representations are estimated. An optical flow estimation process is applied to the discrete-time derivatives to produce a raw optical flow field. The raw optical flow field is scaled by the non-octave pyramid factor. The above-cited steps are repeated for the pair of images at another pyramid scale until all pyramid scales have been visited to produce a final optical flow field, wherein spatiotemporal gradient estimations are warped by a previous raw optical flow estimation.

34 Claims, 7 Drawing Sheets

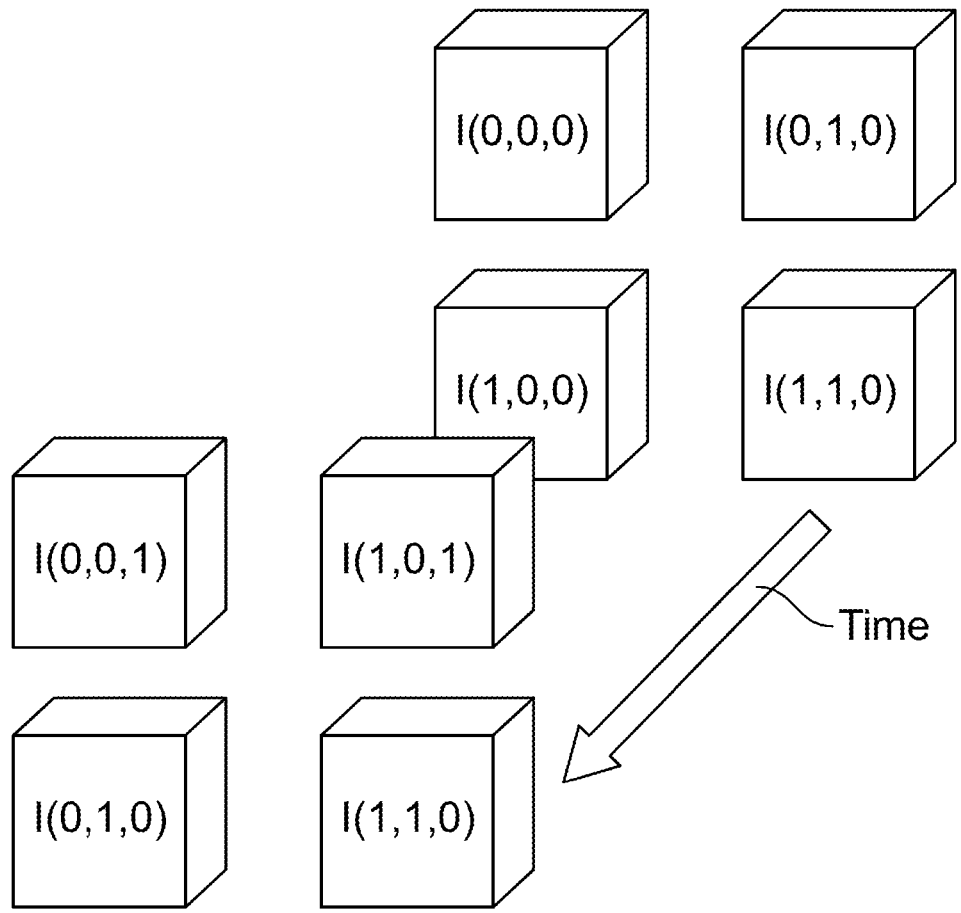

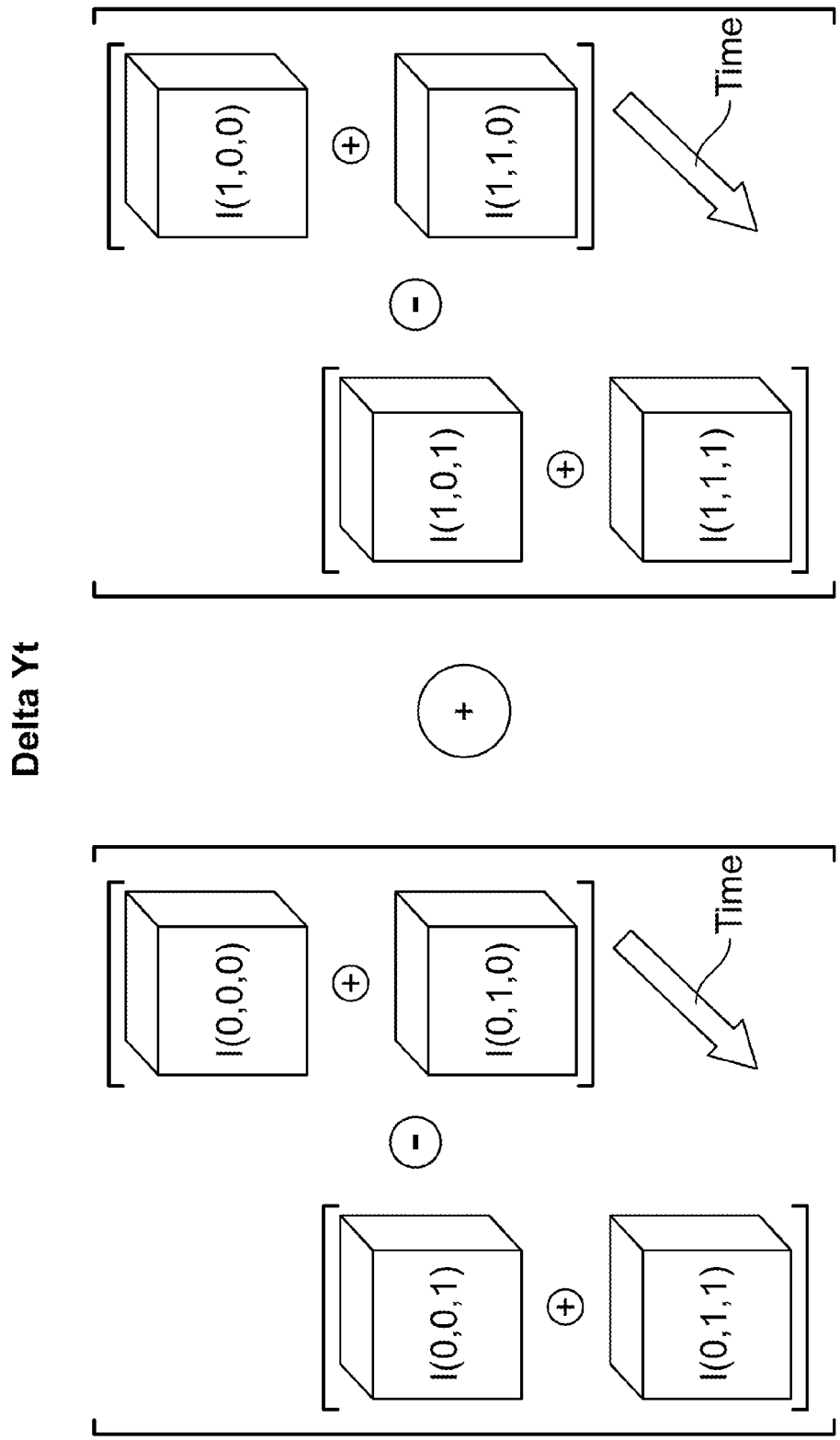

DIGITAL PROCESSING METHOD AND SYSTEM FOR DETERMINATION OF OPTICAL FLOW

CROSS-REFERENCE TO RELATED APPLICATIONS

This application claims the benefit of and is a continuation of U.S. patent application Ser. No. 13/712,030 filed Dec. 12, 2012, which is a continuation of U.S. patent application Ser. No. 12/555,472 filed Sep. 8, 2009, now U.S. Pat. No. 8,355,534, the disclosures of which are incorporated herein by reference in their entirety. This application further claims the benefit of U.S. provisional patent application No. 61/105,515 filed Oct. 15, 2008, the disclosure of which is incorporated herein by reference in its entirety.

FIELD OF THE INVENTION

The present invention relates generally to digital image processing, and more particularly, to a method and system for automatic determination of an optical flow field between a pair of images.

BACKGROUND OF THE INVENTION

Determining an optical flow field between two images, particularly for sequences of video frames and/or fields, is frequently encountered step in many high-value video processing tasks such as coding, frame rate conversion, noise reduction, etc. Known methods for calculating optical flow encounter several stumbling blocks. Many methods suffer from low accuracy—motion vectors may not reflect the actual motion; others lack precision—motion vectors are limited to a precision on the order of a single pixel or a particular fraction of a pixel in a limited region; still others suffer from a lack of density—single motion vectors may be available only for entire regions or blocks of an image, instead of on a per-pixel basis. Additionally, widely varying computational and memory bandwidth costs accrue to many, if not all, of these methods.

Existing methods may be broadly sorted into three categories: (1) block-based matching; (2) phase-based estimation; and (3) gradient based estimation. Block-based matching methods are frequently used in video coding and other real-time tasks due to their relatively small complexity and intuitive nature. However, block-based matching methods are limited in dynamic range by the extent of a block search, limited in precision by the granularity of the block search, limited in the accuracy of an interpolator used to sample pixel values at the sub-pixel level, and limited in accuracy due to what is known as the "aperture problem." The "aperture problem" occurs when a block matching method estimates a wrong motion vector due to lack of sufficient differences between blocks with no texture or edge differences along a gradient, which results in a motion vector at a local minimum instead of the global minimum. Prior art block-based optical flow and motion-estimation methods suffer from the aperture problem, which is further exacerbated in block based methods that attempt to reduce search complexity by using multi-scale or other techniques to reduce the search depth and breadth from that of an exhaustive search. Many block based methods circumvent the aperture problem by not requiring absolute (or even coarse) accuracy of an optical flow estimation. Such methods code only the residual differences left over after applying an optical flow field in a motion-compensation step between two frames under observation. As a result, motion-compensated block-based methods have found widespread application in the field of video coding, at the expense of reduced accuracy.

Phase-based motion estimation techniques have been employed for computing relatively accurate, precise, and sub-stantially noise-immune optical flow, such as the phase-based motion estimation method described in "The Engineer's Guide to Motion Compensation," by John Watkinson, 1994: Snell & Wilcox Ltd., pp 23-38. However, phase-based motion estimation is performed in the frequency domain and acts upon the phase information computed therein, and therefore requires input images to be transformed to the 2D frequency domain, a very computationally expensive process for video. In an attempt to improve computational efficiency, certain other phase-based motion estimation processes have shown incremental improvement over processes based on Fourier-based phase calculations by changing the type of transform from global to local, such as Gabor-based orientation-based transform filtering. Unfortunately, these techniques still involve relatively applying large filter-banks sequentially to each pixel, resulting in a high memory bandwidth requirement with only a modest decrease in relative overall computational complexity and memory bandwidth requirements.

Gradient-based estimation has been employed in several offline and real-time applications, including object segmentation for FLIR (Forward-Looking Infra-Red) target acquisition/rejection as taught in U.S. Pat. No. 5,627,905, and the calculation of temporal-interpolated video frames ("tween frames") for slow-motion and frame-rate conversion effects, as taught in Thanakorn and Sakchaicharoenkul, "MCFI-based animation tweening algorithm for 2D parametric motion flow/optical flow," Machine Graphics & Vision International Journal, v.15 n.1, p. 29-49, January 2006. The classic optical flow methods taught in B. K. P. Horn and B. G. Schunck, "Determining optical flow," *Artificial Intelligence*, vol. 17, pp. 185-203, 1981 (hereinafter "Horn and Schunck"), and Lucas, B. D. and Kanade T., 1981, "An iterative image registration technique with an application to stereo vision," *Proceedings of Imaging understanding workshop*, pp. 121-130 (hereinafter "Lucas and Kanade"), produce dense optical flow fields on a per-pixel basis, but cannot reliably generate motion vectors with magnitudes greater than a single pixel, and suffer from inconsistent flow fields in the presence of severe noise, object occlusions, and complex non-translational motion. The method and system described in U.S. Pat. No. 5,680,487 overcomes the single-pixel limitation by using a multi-scale method, but is not robust in the presence of noise and/or occlusions. Further improvements to gradient-based estimation are taught in the U.S. Pat. No. 6,345,106, where an eigen-system analysis is applied to each pixel's surrounding gradient region via eigen analysis of the structure tensor associated with every pixel, to ascertain the mathematical stability of the estimation process. This allows the calculation of a confidence value that may be used to selectively accept or reject calculated results, thereby increasing robustness to noise and to the aperture problem.

Another improvement to gradient-based estimation is to use the second-derivatives ("gradient-constancy assumption") instead of brightness ("brightness-constancy assumption") to estimate the actual gradients under examination in order to increase the robustness of the calculation to changes in scene and object lighting as taught in Nagel, H.-H. and Enkelmann, W., "An investigation of smoothness constraints for the estimation of displacement vector fields from image sequences," IEEE trans. Pattern Anal. Mach. Intell., September 1986, 8, pp. 565-593 (hereinafter "Nagel and Enkelmann"). A drawback to the approach used by Nagel and Enkelmann is that the gradient-constancy constraint is violated under complex motion models such as scaling and rotation. Additionally, the estimation of discrete-space spatiotemporal derivatives under the scheme of Nagel and Enkelmann has proved to make error-free implementation problematic.

The foregoing prior art optical flow methods suffer from mathematical instability in the presence of noise and occlusions, and are further impaired by a consistently-applied, but very coarse approximation of the actual spatio-temporal gradient calculation upon which the rest of the estimation process is dependent (such as the central-differences method, which completely ignores the sampled values at the actual sample location under analysis). These coarse approximations lead to unnecessary errors in the initial estimation process, forcing subsequent stages to clean up or reject estimated values based upon further imperfect heuristics, thresholds, or constraints, all accomplished at a significant expense of further complexity.

The foregoing prior art optical flow methods further suffer from one or more of the problems of: (1) high computational complexity, (2) noise susceptibility due to numerical instability, (3) failure to account for occlusions of pixels from one frame to the other, (4), limited range of motion, (5) inability to accurately calculate a flow field in the presence of changes of brightness due to lighting changes in the scene or of objects in the scene, and/or (6) accuracy problems due to incorrect or inadequate assumptions in the model of the discrete-sampled gradient field.

Accordingly, there is a need for an accurate, precise, relatively low-computational-complexity digital optical flow estimation method and system that is better suited to operate on noisy video images that include changing scene and object lighting, complex motion, and object occlusions.

SUMMARY OF THE INVENTION

The above-described problems are addressed and a technical solution is achieved in the art by providing method and system for determining an optical flow field between a pair of images, comprising the steps of: (a) decomposing each of the pair of images into image pyramids using a non-octave pyramid factor; (b) transforming the pair of decomposed images at a first pyramid scale to second derivative representations under an assumption that a brightness gradient of pixels in the pair of decomposed images is constant; (c) estimating discrete-time derivatives of the second derivative image representations; (d) applying an optical flow estimation process to the discrete-time derivatives to produce a raw optical flow field; (e) scaling the raw optical flow field by the non-octave pyramid factor; and (f) repeating steps (b)-(e) for the pair of images at another pyramid scale until all pyramid scales have been visited to produce a final optical flow field, wherein spatiotemporal gradient estimations in step (c) are warped by a previous raw optical flow estimation.

According to an embodiment of the present invention, the method may further comprise the step of (g) transforming the second derivative image representations from color-space to a scalar color-distance space. Step (g) may be implemented using the Laplacian of the vector subtraction of color-distances. The Laplacian operator may be applied to intensities of all color channels of the second-derivative image representations separately. The non-octave pyramid factor is chosen to be between 1.5 and 2.0.7.

According to an embodiment of the present invention, the first pyramid scale may be the lowest resolution pyramid scale and another pyramid scale is next higher resolution pyramid scale. Step (c) may be accomplished using a spatiotemporal gradient estimation method. The optical flow estimation process may employ a least-squares-fit method.

According to an embodiment of the present invention, the method may further comprise the step of employing a pre-scaling step via bilinear interpolation to ensure that the highest resolution pyramid scale devolves to integer image sizes of width and height. The method may further comprising the step of processing the raw optical flow field with at least one non-linear filter that imposes a non-linear, piecewise-linearity constraint on the optical flow field. The at least one non-linear filter is at least one of non-linear low-pass, smoothing, and statistical regularization filter, which may be at least one of a total variation minimization (L1 and L2 norm) filter, an anisotropic diffusion filter, an elliptic steerable filter that reacts to local image structures, and a kernel regression filter.

According to an embodiment of the present invention, the method may further comprise the steps of employing performing multiple-pixel motion-compensation and a sum-of-square-differences calculation on the raw optical flow field to check inverse consistency of the raw optical flow field on a per-pixel-sample basis. The method may further comprise the step of applying a 2D structure tensor eigensystem analysis to the discrete-time derivatives to provide a feedback mechanism for selecting a non-octave (2.0) pyramid scaling factor between 1.5 and 2.0 at the subsequent lower resolution pyramid scales. When small eigenvalues below a threshold percentage of pixels for a single pyramid scale in excess of other pyramid scales is encountered during the 2D structure tensor eigensystem analysis, a finer pyramid scale is used for at least one of the subsequent pyramid scales.

The raw optical field flow is processed in reverse order. A motion vector is used to sample the second image of the pair of images in five or more locations of a Robert's Cross configuration. According to an embodiment of the present invention, the method may further comprise the step of processing the raw optical flow field for all pyramid scales by a (non-linear) 3×3 median filter operation to eliminate single-pixel outliers and processing the filtered raw optical flow field with an L2 norm total variation operator for a variable number of iterations.

BRIEF DESCRIPTION OF THE DRAWINGS

The present invention will be more readily understood from the detailed description of an exemplary embodiment presented below considered in conjunction with the attached drawings, of which:

FIG. 2 shows a discrete-time approximation of the Laplacian operator in two dimensions;

FIG. 3A shows a discrete-time central-difference operator in one dimension;

FIG. 3B shows a discrete-time central-difference operator in two dimensions;

FIG. 4A is a space-time cube of a sampling region in three dimensions, according to an embodiment of the present invention;

FIGS. 4B-4E shows a estimated gradient method using the space time cube of FIG. 4A, according to an embodiment of the present invention.

DETAILED DESCRIPTION OF THE INVENTION

Figure 1:
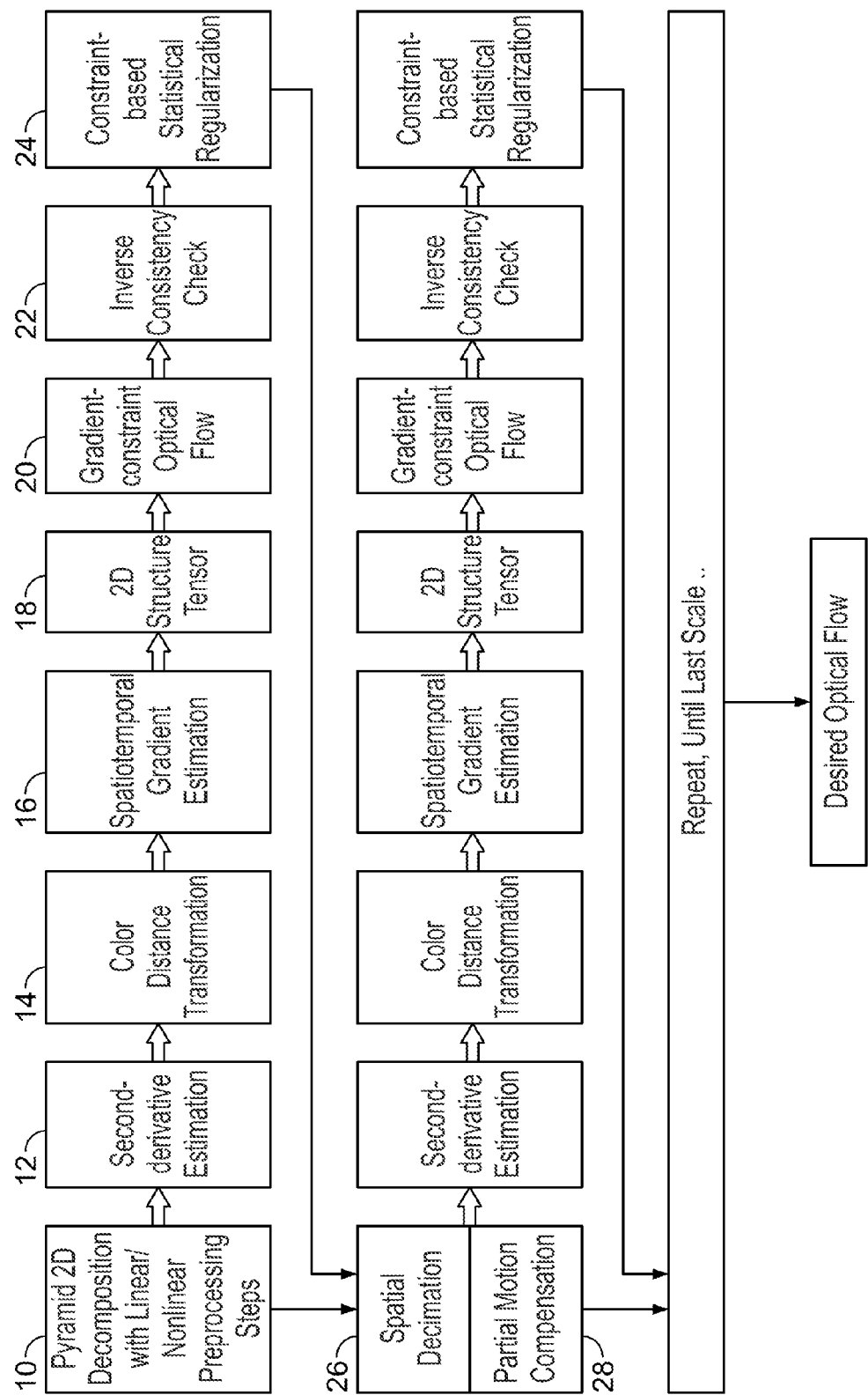
FIG. 1 depicts a process flow diagram illustrating exemplary steps for computing an optical flow field between a pair of images, according to an embodiment of the present invention.

FIG. 1 depicts a process flow diagram illustrating exemplary steps for computing an optical flow field between a pair of images, according to an embodiment of the present invention. At step 10, each of the pair of images is decomposed into image pyramids. In the process of generating the image pyramids, at least one of several linear and/or non-linear filters may be applied to the decomposed pair of images. The image pyramids may be decomposed using arbitrary scaling factors less than one-octave-per-level in order to reduce the problem of later estimation steps being fixated at a local minimum instead of the global minimum, thereby preventing what is known as an "aperture problem." At step 12, at the lowest resolution image pyramid scale, the pair of decomposed images is transformed to second derivative representations under an assumption that the brightness gradient (or, alternatively, the second derivative of the brightness) is assumed to be constant. At step 14, the second derivative representations of the pair of images are transformed from color-space to a scalar color-distance space. At step 16, a spatiotemporal gradient estimation method is used to estimate discrete-time derivatives of the second derivative image representation. At step 18, a 2D structure tensor eigensystem analysis is applied to the discrete-time derivatives to provide a feedback mechanism for selecting a non-octave (2.0) pyramid scaling factor between 1.5 and 2.0 at subsequent pyramid scales. At step 20, a known constraint-based optical flow estimation process is applied to the discrete-time derivatives using a least-squares-fit method to produce a raw optical flow field. At step 22, a multiple-pixel motion-compensation step and a sum-of-square-differences calculation is performed on the raw optical flow field to further check the inverse consistency of the constrain-based optical flow estimation calculation on a per-pixel-sample basis. At step 24, the resultant raw optical flow field calculation is further processed by non-linear filtering steps that have the combined effect of efficiently imposing a non-linear, noise-robust piecewise-linearity constraint on the flow field. In certain embodiments, the non-linear filter is a statistical regularization filter for reducing susceptibility to noise and to efficiently impose further statistical constraints that improve the accuracy and precision of the optical flow estimation. At step 26, the optical flow field is multiplied by the non-octave pyramid factor, scaled spatially, and propagated to the next higher resolution pyramid scale whereupon, at step 28, spatiotemporal gradient calculations are motion compensated (warped) by the previous optical flow estimation. Steps 12-28 are repeated for each subsequent pyramid scale until all of the pyramid scales have been visited to produce a final optical flow field.

It is an object of the present invention to provide an accurate optical flow field from the spatiotemporal gradients of two images. As illustrated in the gradient-based optical flow models outlined in Horn and Shunck and Lucas and Kanade, a determination of an optical flow field between two arbitrary image samples of a scene/set of objects is an ill-posed inverse problem which may have more than one solution, no solution at all, or an infinity of solutions. To constrain the ill-posed inverse problem, one or more constraints are necessary. A well-known constraint employed in prior art is the "brightness constancy assumption," which assumes that, in spite of motion, the brightness of objects in the two sampled images remains constant. The object's representation in the sampled images is described by Equation 1:

$$I(x,y,t) = \text{object}(x+ut, y+vt) \tag{1}$$

where x, y, and t are continuous-domain spatiotemporal locations of the observed light-field, I is the intensity or luminance of the object at the location designated by x, y, and t, and u and v represent vector describing translational motion of the object. A constraint equation based on the brightness constancy assumption is shown in Equation 2 in terms of partial derivatives:

$$[\partial I(x,y,t)/\partial x] \cdot u + [\partial I(x,y,t)/\partial y] \cdot v + [\partial I(x,y,t)/\partial t] = 0 \tag{2}$$

The "brightness constancy assumption" breaks down for sets of two images where lighting has changed from one image temporal sample-point to the other, or when the objects move from light to shadowed regions between two image sample times. A different but related constraint is the "gradient constancy constraint" as described in Nagel and Enkelmann, which, like the "brightness constancy assumption," assumes a constant for a given object, but instead of the brightness of the object with respect to motion being assumed constant, the brightness gradient (or, alternatively, the second derivative of the brightness) is assumed to be constant, as shown in Equation 3 hereinbelow, where the second derivative may be approximated with application of the (discrete time) Laplacian operator $\nabla$ as illustrated in FIG. 2:

$$\left[\frac{\partial L(x, y, t)}{\partial x}\right] \cdot u + \left[\frac{\partial L(x, y, t)}{\partial y}\right] \cdot v + \left[\frac{\partial L(x, y, t)}{\partial t}\right] = 0 \tag{3}$$

bmv

...

$$L(x, y, t) = \nabla(I(x, y, t))$$

Use of the "gradient constancy constraint" in Equation 3 has the effect of assuming that in spite of motion, relative edges' luminance intensity and texture features' intensity relationships of objects in two images being compared to determine optical flow remain constant, even in the circumstance of ambient lighting changes. This approach may be approximated in the discrete domain by convolving each of the input images with the discrete approximation of the Laplacian operator $\nabla$, as illustrated in FIG. 2, and then applying the same gradient estimation process upon the convolved image samples instead of the original image intensity samples in the discrete domain.

The second derivative of the brightness or luminance of the image samples may be made more specific and selective by introducing the color values themselves—whereas the approach in the prior art is to use the dot product of the three-vector comprising the RGB or YUV values from a color image to calculate a single luminance/intensity scalar value, typically as some close variation of Equation 4:

$$I(x,y,t) = [0.30, 0.59, 0.11]^T \cdot [I_R(x,y,t), I_G(x,y,t), I_B(x,y,t)]^T \tag{4}$$

This simplifies the problem by reducing an RGB or YUV three-vector to a single scalar value (and poses the input data in terms of brightness, the original assumption), but neglects any potential information that chrominance may provide in addition to luminance. For example, a dark green pixel will be mathematically indistinguishable from a brighter blue pixel. In certain applications, this difference may be negligible, but in others, small difference may be critical.

According to an embodiment of the present invention, a color-distance function D is defined between two RGB (or YUV) 3-vector samples $I_1$ and $I_2$ in Equation 5:

$$D_{RGB}(x_1,y_1,t_1,x_2,y_2,t_2)=I_1(x_1,y_1,t_1)-I_2(x_2,y_2,t_2) \quad (5)$$

where the subtraction in Equation 5 is meant in the vector sense of subtraction over $\mathcal{R}^3$. Those skilled in the art will recognize that color-distance function D effectively defines the magnitude of the distance between two 3-vector colors within a 3-dimensional color cube. The benefit of using the color-distance function D is that it introduces chrominance/color as an additional constraint in addition to the luminance, while still reducing to a single scalar value. It is reasonable to assume that if most objects change in inherent brightness, then they will not change inherent color and brightness. Additionally, many contemporaneous GPU and DSP hardware platforms common to video and image processing systems implement this type of operation as a single-clock-cycle primitive machine instruction.

Additionally, those skilled in the art will appreciate that a more precise color differences measure and method such as that defined in CIE76, or more recently, CIEDE2000, may also be used, which are incorporated herein by reference, and which may reduce calculations to easily vectorized operations suitable for DSP and GPU computation. A subtle byproduct of employing a color difference is that while changes in brightness may be expressed intuitively in terms of negative (growing dimmer) or positive (growing brighter) values—the concomitant concept for color vectors is not intuitive and is in fact arbitrary. The chosen mapping will ideally weight 50% of the likely color range in given images as a smaller/negative scalar mapped value, and the other 50% as a larger/positive value, with as even a distribution as possible for most images and video. The overall approach is anticipated in Shibata, M.; Yanagisawa, T., "A study of optimal angle of color vector for optical flow extraction," SICE, 2007 *Annual Conference*, vol., no., pp. 2518-2523, 17-20 Sep. 2007, while the mapping chosen for a preferred embodiment is simply to calculate the angle of the 2-vector comprising U and V of the current pixel, normalized to 0.0 to 1.0.

The preferred embodiment may employ a similar technique to that found in Nagel and Enkelmann with regard to using the Laplacian of the intensity for robustness against lighting and illumination changes. In a preferred embodiment, the Laplacian of the vector subtraction of color-distances may be employed instead of the Laplacian of the intensity-differences. To put this combination in practice, in the preferred embodiment, the Laplacian operator is applied to the intensities of all "color" channels of the image separately, whether in RGB color space or YUV color space as shown in Equation 6:

$$L_R(x,y,t)=\nabla(I_R(x,y,t))$$

$$L_G(x,y,t)=\nabla(I_G(x,y,t))$$

$$L_B(x,y,t)=\nabla(I_B(x,y,t)) \quad (6)$$

The constraint equation (s) now, therefore, become that of Equation 7:

$$\left[\frac{\partial L_R(x,y,t)}{\partial x}\right]\cdot u + \left[\frac{\partial L_R(x,y,t)}{\partial y}\right]\cdot v + \left[\frac{\partial L_R(x,y,t)}{\partial t}\right] = 0$$

...

$$\left[\frac{\partial L_G(x,y,t)}{\partial x}\right]\cdot u + \left[\frac{\partial L_G(x,y,t)}{\partial y}\right]\cdot v + \left[\frac{\partial L_G(x,y,t)}{\partial t}\right] = 0$$

...

$$\left[\frac{\partial L_B(x,y,t)}{\partial x}\right]\cdot u + \left[\frac{\partial L_B(x,y,t)}{\partial y}\right]\cdot v + \left[\frac{\partial L_B(x,y,t)}{\partial t}\right] = 0$$

It will be further appreciated by those skilled in the art that the combination of the color constraint with the second-derivative assumption means that only accelerations of color value changes are considered, not color changes themselves—more likely to be due to actual motion of objects in the sense that an ambient lighting of an object changing from reddish to greenish of equal presumptive luminance intensity will not defy the constraint. The incorporation of the additional information of color in addition to intensity helps to distinguish otherwise indistinguishable gradients due to issues of limited size of evaluation aperture, and problems related to the underdetermined nature of the solution.

It is desirable to find the best way to model sampling locations and weighting coefficients when constructing the discrete-domain approximation of the spatiotemporal gradients that underlie the aforesaid partial derivatives. One exemplary problem that needs to be solved is ensuring the consistent locality the above disclosed approximations (e.g., ensuring that the dI/dx gradient approximation is conducted in the same spatial sampling location as the dI/dy gradient approximation). Optical flow accuracy is particularly sensitive to small variations of these approximations. For a complete treatment on this subject, the teachings found in Kennedy, H. L. 2007. Gradient Operators for the Determination of Optical Flow. In *Proceedings of the 9th Biennial Conference of the Australian Pattern Recognition Society on Digital Image Computing Techniques and Applications* (Dec. 3-5, 2007). DICTA. IEEE Computer Society, Washington, D.C., 346-351., and in Christmas, W. J., "Spatial Filtering Requirements for Gradient-Based Optical Flow Measurement," Centre for Vision, Speech and Signal Processing University of Surrey, Guildford GU2 5XH, UK, are instructive.

Figure 4B:
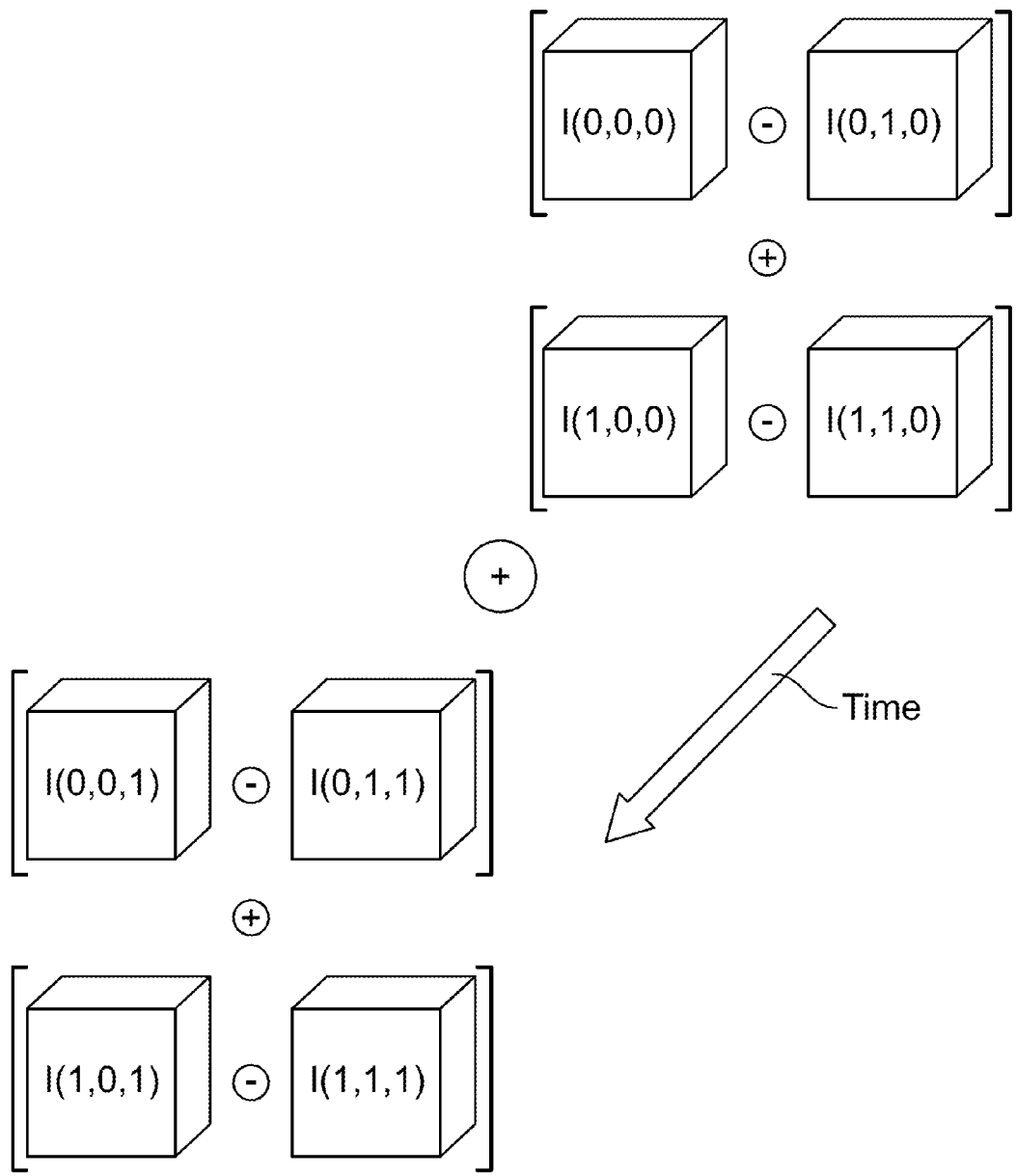
Figure 4C:
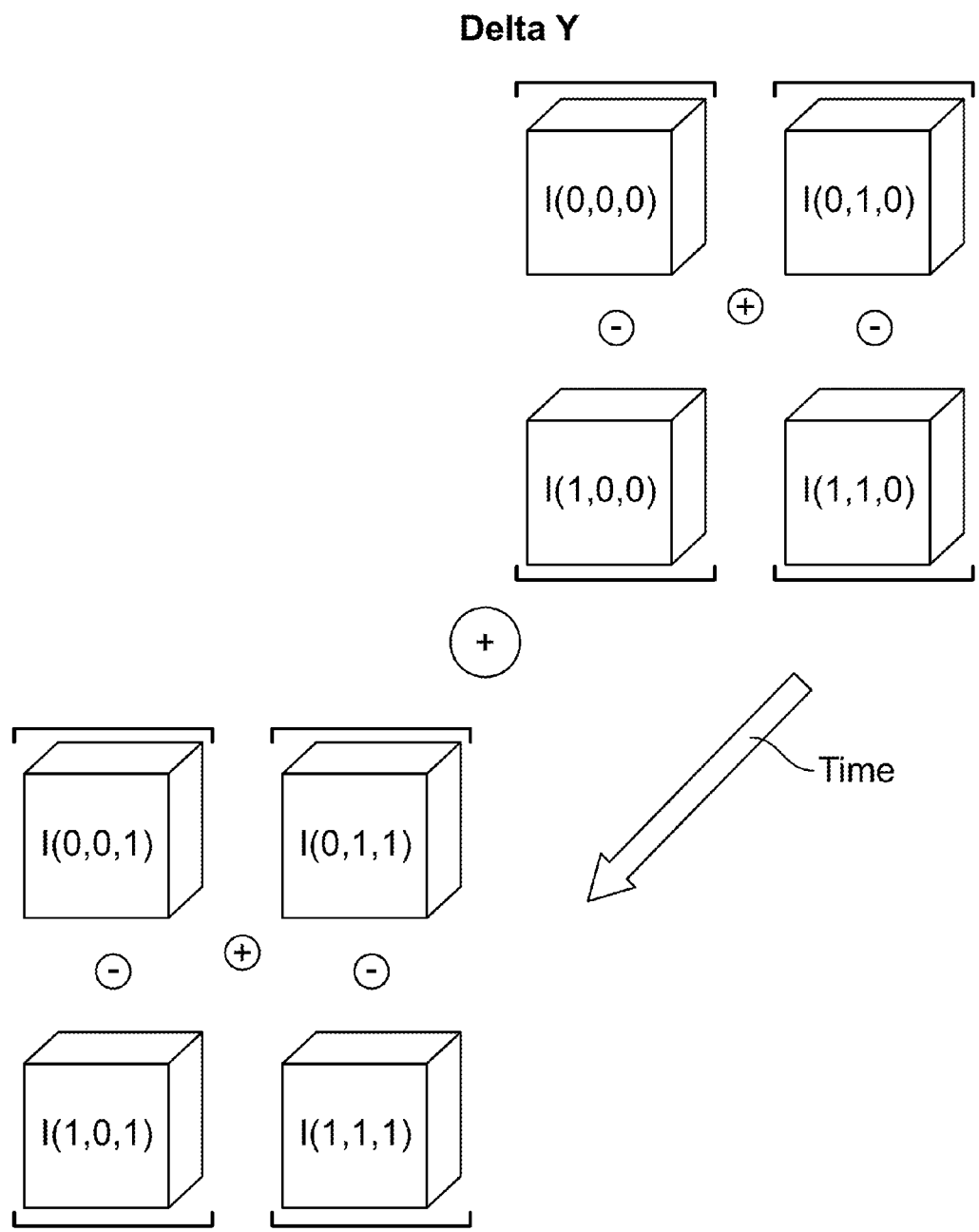
Figure 4D:
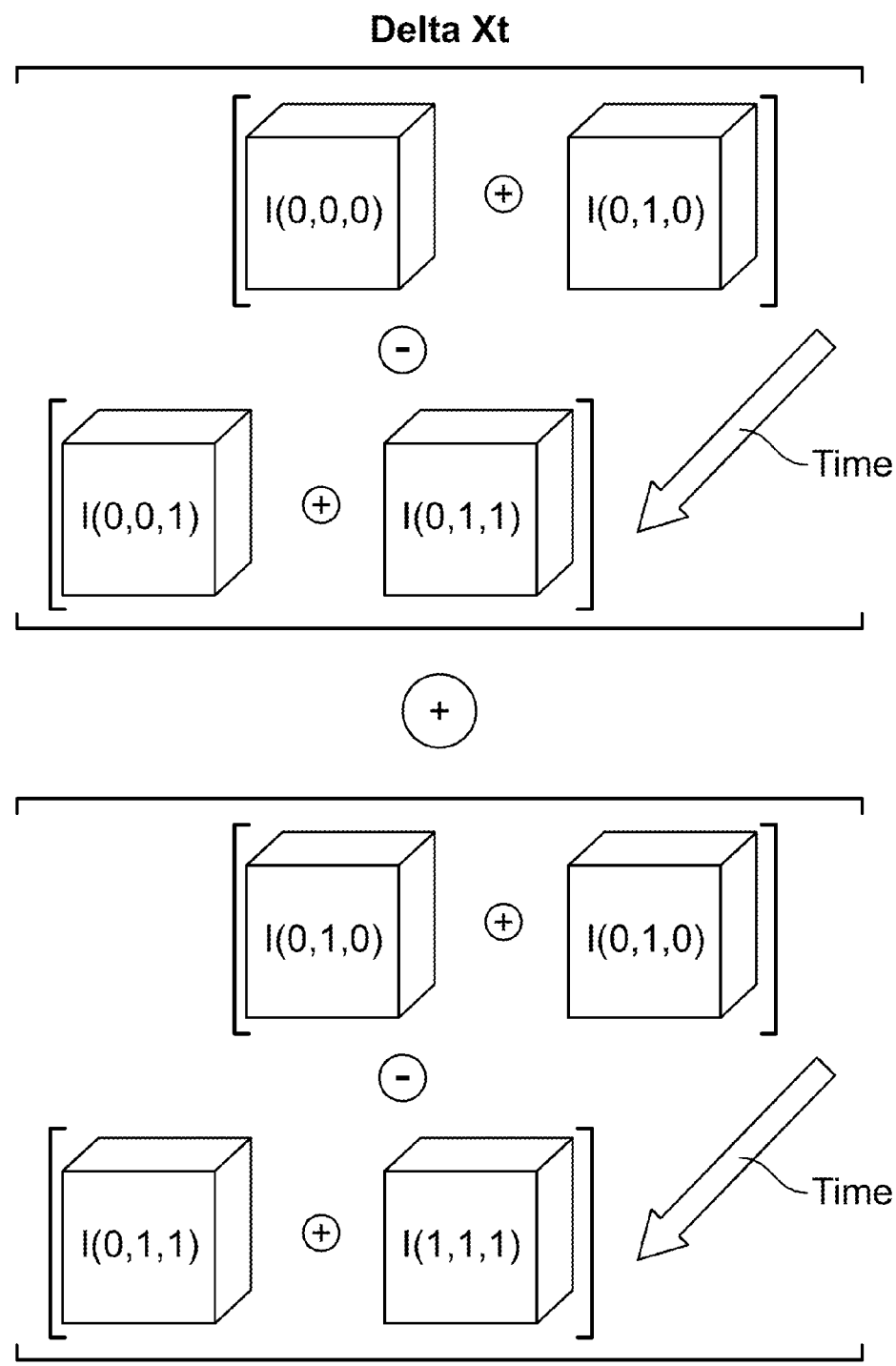

As an example, consider the often applied central-difference operator, illustrated in FIG. 3A for 1 dimension. While the locality of the measurement of the gradient may be considered to be centered locally at 0, the sampled information at location 0 itself is completely neglected. Also, the forward difference along the x axis, when considered with the forward difference along the y-axis, estimates the spatial gradient using two dimensions as shown in FIG. 3B. To provide for a consistently local gradient calculation, according to another aspect of the present invention, the discrete-sampled spatiotemporal gradient field is specifically modeled for an eight-pixel spatiotemporal region, shown in FIG. 4A, as a series of approximate discrete-domain partial differentiations of either the intensity of the pixel samples as shown in Equation 8:

$$\frac{\partial I}{\partial x} = \frac{I(0,0,0)-I(1,0,0)}{2} + \frac{I(0,1,0)-I(1,1,0)}{2} + \frac{I(0,0,1)-I(1,0,1)}{8} + \frac{I(0,1,1)-I(1,1,1)}{8} \quad (8)$$

$$\frac{\partial I}{\partial y} = \frac{I(0,0,0)-I(0,1,0)}{2} + \frac{I(1,0,0)-I(1,1,0)}{2} + \frac{I(0,0,1)-I(0,1,1)}{8} + \frac{I(1,0,1)-I(1,1,1)}{8}$$

$$\frac{\partial I}{\partial x \partial t} = \frac{I(0,0,0)+I(1,0,0)}{4} - \frac{I(0,0,1)+I(1,0,1)}{4} +$$

-continued
$$\frac{\partial I}{\partial y \partial t} = \frac{I(0,0,0)+I(0,1,0)}{4} - \frac{I(0,0,1)+I(0,1,1)}{4} + \frac{I(0,1,0)+I(1,1,0)}{4} - \frac{I(0,1,1)+I(1,1,1)}{4} + \frac{I(1,0,0)+I(1,1,0)}{4} - \frac{I(1,0,1)+I(1,1,1)}{4}$$

or, alternatively, the aforementioned color distances of the Laplacian of the pixel samples, as shown in Equation 9:

$$\frac{\partial D_{RGB}}{\partial x} = \frac{D_{RGB}(0,0,0,1,0,0)}{2} + \frac{D_{RGB}(0,1,0,1,1,0)}{2} + \frac{D_{RGB}(0,0,1,1,0,1)}{8} + \frac{D_{RGB}(0,1,1,1,1,1)}{8}$$
$$\frac{\partial D_{RGB}}{\partial y} = \frac{D_{RGB}(0,0,0,0,1,0)}{2} + \frac{D_{RGB}(1,0,0,1,1,0)}{2} + \frac{D_{RGB}(0,0,1,0,1,1)}{8} + \frac{D_{RGB}(1,0,1,1,1,1)}{8}$$
$$\frac{\partial D_{RGB}}{\partial x \partial t} = \frac{D_{RGB}(0,0,0,0,0,1)}{4} + \frac{D_{RGB}(1,0,0,1,0,1)}{4} + \frac{D_{RGB}(0,1,0,0,1,1)}{4} + \frac{D_{RGB}(1,1,0,1,1,1)}{4}$$
$$\frac{\partial D_{RGB}}{\partial y \partial t} = \frac{D_{RGB}(0,0,0,0,0,1)}{4} + \frac{D_{RGB}(0,1,0,0,1,1)}{4} + \frac{D_{RGB}(1,0,0,1,0,1)}{4} + \frac{D_{RGB}(1,1,0,1,1,1)}{4}$$
(9)

The gradient calculations of Equations 8 and 9 account for consistent locality by including every pixel of a 2×2×2 spatiotemporal pixel region in every approximated partial differential calculation—a strategy avoided in the prior art due to possible positive half-pixel spatial sampling bias and quarter-pixel temporal sampling bias (i.e., the gradient as previously expressed is said to be measured at the location $L_{RGB}(0.5, 0.5, 0.25)$ instead of at $L_{RGB}(0.0, 0.0, 0.0)$). This spatiotemporal bias may be avoided as long as it is handled in later steps that utilize the aforementioned estimated gradient method. In fact, the gradient estimation method of Equation 9 is stable in the presence of signal noise and first-order discontinuities, as shown in FIGS. 4B-4E.

The aforementioned method of calculating gradients as expressed in Equation 9 is useful to the extent that it may be used only to calculate local motion vectors, e.g., within a 1-pixel range of the region covered by the spatiotemporal gradient calculation. Also well known for purposes of expanding the locality of such calculations (not limited to optical flow, but block matching, and many other applications, as well) is the use of multi-scale image pyramids for the purpose of implementing a coarse-to-fine strategy wherein a calculation is evaluated over coarse-to-fine scales, in turn propagating the results of the previous scale's calculation to the next scale, until the last scale is reached.

In the particular case of optical flow estimation, the coarse-to-fine strategy in the prior art takes the form of creating an image pyramid, where the source image is low-pass-filtered with a convolution approximating a Gaussian operator in order to prevent frequency-aliasing, and a subsequent decimation-in-space (typically, order-0 or order-1 interpolation) that creates an image one half the height and width of the original (one-octave spatial decimation), and the process is repeated for a fixed number of scales—with previous scales providing the input for subsequent ones. Then, the optical flow calculation is performed at the highest scale (smallest or lowest resolution pyramid image), where the resultant optical flow magnitudes' vector u and v components for the scale are multiplied by 2. The results are used to warp the next scale's image, the residual optical flow is calculated, and the result is used to warp the next scale, and so on. When the final scale is reached, a sufficiently useful nonlocal optical flow field has been created.

Unfortunately, the 2× coarse-to-fine approach in the prior art suffers from significant drawbacks similar to the drawbacks encountered by using 2× coarse-to-fine "multi-scale" approaches previously disclosed for block-matching methods in the prior art—namely that the calculation at a particular scale may fixate upon a local minimum according to whatever constraint is used to make the problem well-posed, instead of the true, global minimum.

The present invention utilizes image pyramids, with two key improvements: first, the present invention employs non-linear, non-Gaussian, low-pass, smoothing, or statistical regularization filters for the creation of image pyramids, including but not limited to total variation minimization (L1 and L2 norm) filters, anisotropic diffusion filters, elliptic steerable filters that react to local image structures, kernel regression filters, and other non-linear filters. Linear filtering is primarily used to reduce spatial-frequency aliasing artifacts when the images are decimated. Such non-linear filtering operations may improve the robustness to noise and performance around motion boundaries of later steps. More particularly, according to an embodiment of the present invention, a single iteration of the L2 norm total variation filter in conjunction with the Gaussian operator may be used for each scale, which exhibits significant improvement in noise-sensitivity characteristics.

The second improvement, according to an embodiment of the present invention, is the use of a pyramid generation factor other than 2.0. Pyramid generation factors other than 2.0 are needed to process image pairs having severe noise impairments and strong first-order gradients. As the pyramid generation factor decreases from the integer scalar value of 2, to smaller, real scalar values larger than 1.0, the local minimum fixation problem becomes less and less prominent (at significant cost of memory storage, bandwidth, and computational complexity, especially as the factor approaches 1.0). According to an embodiment of the present invention, an arbitrary pyramid factor between 1.5 and 2.0 may be used. The local minimum problem becomes decreasingly prominent as scaling factors decrease from 1.75 to 1.5, respectively, but with a tradeoff in sensitivity to noise. For a preferred factor of 1.75, additional memory storage requirements and computational complexity requirements may increase by about 13% greater than for a factor of 2.0 for a 5-level pyramid, but with a 25% improvement in granularity, and relatively large concomitant reduction in the likelihood of becoming fixated on a coarse-scale local minimum, thereby representing a good trade-off of complexity versus accuracy. It should be noted that many prior art approaches solve this particular problem with iterative refinement solutions, which may increase the computational complexity as much as 10,000% for such aforesaid noise-impaired sources at a given scale, instead of the preferred embodiment's 13%. Yet other approaches characterize the problem as completely unsolvable at a given image location via structure analysis, which imposes later non-linear post-processing requirements, or statistical regularization requirements (again, iterative, with significant attendant costs), which may result in a completely unusable optical flow field in the given image location.

It will be appreciated by those skilled in the art that the use of non-integer pyramid values may increase the likelihood of circumstances where repeated bilinear interpolation of both (1) image pyramid values and (2) subsequent motion vector fields of a given scale may be required due to non-integer sampling locations. While order-0 interpolation may be needed, the benefits using order-0 interpolation do not outweigh the significant estimation errors that accrue when compared to using non-2× image pyramids in most DSP and GPU platforms. While order-1 interpolation of image values may be provided as a hardware primitive in GPU platforms, this may not be the case (at least, efficiently) for DSP or FPGA systems. For this reason, according to a preferred embodiment, a pre-scaling step via bilinear interpolation may be used (or a higher-order scaling operator, such as cubic or bi-cubic) to ensure that the initial scale (initial, highest, resolution) devolves to integer image sizes of (W',H') thereby significantly reducing the need for repeated inter-sample interpolation when applying the image pyramid for a depth of N scales as in Equation 10:

$$W' = \text{floor}(W/N) \times \text{pyramid\_factor}^N$$

$$H' = \text{floor}(W/N) \times \text{pyramid\_factor}^N \qquad (10)$$

The final scale's resultant optical flow field has its magnitudes multiplied by the inverses of Equation 10's width and height factors instead of the usual 2.0, and scaled spatially according to the same inverse non-integer width and height factors instead of a one-octave decimation.

It is desirable to reduce the ill-posed nature of an optical flow calculation that uses partial derivatives—a single calculation with respect to a given partial derivative dimension only gives a continuous linear range of potentially fit values. To reduce these partial derivatives to a single solution, the partial derivatives of many surrounding sampled values may be grouped (which form an underdetermined solution, individually), and a least-squares fit applied. To this end, in a preferred embodiment, the gradient calculations are applied for each pixel sample as envisioned in Equations 8 and 9 to a 3×3 region surrounding the pixel sample as illustrated in Equation 11:

$$\sigma_{xx} = \sum_{n=-1}^{n=1} \sum_{m=-1}^{m=1} \frac{\partial D_{RGB}(n,m)}{\partial x} \cdot \frac{\partial D_{RGB}(n,m)}{\partial x} \cdot \text{weight}(n,m) \qquad (11)$$

$$\sigma_{xy} = \sum_{n=-1}^{n=1} \sum_{m=-1}^{m=1} \frac{\partial D_{RGB}(n,m)}{\partial x} \cdot \frac{\partial D_{RGB}(n,m)}{\partial y} \cdot \text{weight}(n,m)$$

$$\sigma_{yy} = \sum_{n=-1}^{n=1} \sum_{m=-1}^{m=1} \frac{\partial D_{RGB}(n,m)}{\partial y} \cdot \frac{\partial D_{RGB}(n,m)}{\partial y} \cdot \text{weight}(n,m)$$

$$\sigma_{xt} = \sum_{n=-1}^{n=1} \sum_{m=-1}^{m=1} \frac{\partial D_{RGB}(n,m)}{\partial x} \cdot \frac{\partial D_{RGB}(n,m)}{\partial x \partial t} \cdot \text{weight}(n,m)$$

$$\sigma_{yt} = \sum_{n=-1}^{n=1} \sum_{m=-1}^{m=1} \frac{\partial D_{RGB}(n,m)}{\partial y} \cdot \frac{\partial D_{RGB}(n,m)}{\partial y \partial t} \cdot \text{weight}(n,m)$$

In Equation 10, the weight function biases the calculation toward the gradients at the center, and applies less weight to those at a distance. In the preferred embodiment of the present invention, the weight function in Equation 11 is defined in accordance with Equation 12:

$$\text{weight}(n,m) = \{0.125, 0.75, 0.125\} \times \{0.125, 0.75, 0.125\}^T \qquad (12)$$

Information needed to arrive at a mathematically stable result may still be missing. The entire region under analysis may have substantially the same gradient value, or in a more severe case, there is no gradient with which to obtain a numerically stable estimation. In other circumstances, the region under analysis has a single, prominent vertical gradient, in which case, when evaluating a region, any motion vector component cannot be determined except motions perpendicular to the normal to the primary gradient feature, if such a motion even exists.

According to an embodiment of the present invention, a 2-dimensional structure tensor representing the surrounding gradient features of a region of the pair of image under analysis may be employed as in Equation 13:

$$2\text{D\_tensor} = \begin{vmatrix} \sigma_{xx} & \sigma_{xy} \\ \sigma_{xy} & \sigma_{yy} \end{vmatrix} \qquad (13)$$

With a 2-dimensional eigensystem analysis of each structure tensor, one can characterize the current region under evaluation as possessing a primary, strong gradient (the largest eigenvalue magnitude is significantly greater than the second), possessing a strong texture component (both eigenvalues are large), or as homogenous and isotropic (both eigenvalues are small). It is potentially more expensive to do memory reads for table lookups on current GPU and DSP hardware due to memory fetch scheduling and latency than to perform an explicit square root calculation. Therefore, according to an embodiment of the present invention, a direct calculation of eigenvalues is employed. In the preferred embodiment of the present invention, the direct calculation of the two eigenvalues of the aforementioned structure tensor takes the form of Equation 14:

$$\lambda_1 = \frac{-\sigma_{xy} + \sqrt{\sigma_{xy}^2 - 4[(\sigma_{xx}\sigma_{yy}) - (\sigma_{xy}\sigma_{xy})]}}{2\sigma_{xx}} \qquad (14)$$

$$\lambda_2 = \frac{-\sigma_{xy} - \sqrt{\sigma_{xy}^2 - 4[(\sigma_{xx}\sigma_{xy}) - (\sigma_{xy}\sigma_{xy})]}}{2\sigma_{xx}}$$

Additionally, according to the preferred embodiment, the determination of the optimal pyramid scale factor to use (ranging from 1.5 to 2.0) is directed by a feedback mechanism that incorporates information about consistency, locality, and numerical stability of the aforementioned structure-tensor eigensystem analysis. In particular, a preponderance of under-determination or numerical instability indicated by small eigenvalues (or a determinant approaching zero) below a threshold percentage of pixels (defined as statistically deviant, small eigenvalues, typically, for over 10% of the pixel samples in any given image) for a given single scale in excess of other scales, is a positive signal that a finer pyramid scale should be used. In the preferred embodiment of the present invention, subsequent evaluations of optical flow for subsequent pyramid levels in the circumstances that this condition is flagged may use "demoted" pyramid factors, progressing from 1.75, 1.666 and finally to 1.5.

In certain circumstances, the optical flow field calculated for each scale may be impaired by numerical instabilities in that some areas of the images under analysis may not provide any useful optical flow information at all (i.e., the denominator of one or more equations will approach or be zero). For example, if the center of a moving object is homogenously colored, and the object is larger than the aperture afforded by the largest scale of evaluation with the generated image pyramid, the center of such an object will not show consistent motion vectors with the rest of the object because division using the denominator's small size approaches the precision limits of a digital system that implements an optical flow calculation method. Gradient-based optical flow methods may suffer from inconsistent results when confronted with occlusion boundaries (e.g., as a foreground object moves against a still background, some background pixels are occluded at the front of the motion boundary, and others are revealed at the opposite end of the object). Additionally, precision limits may impose instabilities in later stages evaluation steps for subsequent scales.

To address problems related to mathematical stability at motion boundaries and in regions of an image containing occlusions, certain embodiments of the present invention may processing optical flow in reverse (e.g., as though the first frame were the second, and vice-versa). In the presence of sensible motion, both forward and reverse optical flow calculations should result in a motion vector of similar magnitude but possessing a 180-degree-opposite direction (i.e., a "reversibility constraint"). The calculated motion vector is used to sample the current scale's second image in five or more locations, i.e., in a Robert's Cross configuration, according to a preferred embodiment, in order to determine a sum-of-square-differences total of the original RGB or YUV values of the constituent images (i.e., a "motion-compensated SSD constraint"). It will be appreciated by those skilled in the art that other sampling areas/sizes are possible, such as 3×3 pixels, 5×5 pixels, etc., but that the 5-sample Robert's Cross configuration represents an economical compromise. If the reversibility constraint is not satisfied, or the motion-compensated SSD constraint is not satisfied, the residual evaluation for the present scale is reset to (0,0), and the previous scale(s) evaluation of the motion vector are preserved unaltered.

To further address the aforementioned potential mathematical stability problems, certain post-processing steps for each pyramid scale of the raw optical flow field estimation may improve the accuracy and precision of the calculation of subsequent pyramid scales, and thereby improve the accuracy and precision of the final result. In a formal sense, this is commonly modeled as additions to the brightness or gradient constancy constraint disclosed above. In many cases, these additional constraints take the form of smoothness assumptions or piecewise constancy assumptions for the raw optical flow field. According to a preferred embodiment of the invention, the raw optical flow field output for all scales is first processed by a single (non-linear) 3×3 median filter operation so as to eliminate single-pixel outliers. Subsequent to the median filter operation, an L2 norm total variation operator is run against the raw optical flow field estimation for a variable number of iterations, depending upon a user-supplied setting (typically, 1-3 iterations). In the literature, there is considerable inconsistency as to whether a given total variation minimization is meant in the sense of L1 norm (piecewise constancy) or L2 norm (piecewise linearity) in 2D discrete-sampled space. For specificity, in the preferred embodiment of the present invention, the L2 norm TV operator is used, and for a single iteration takes the form of Equation 15:

$$I_x = \frac{[I(1, 0) - I(-1, 0)]}{2}$$

$$I_y = \frac{[I(0, 1) - I(0, -1)]}{2}$$

if $(I_x^2 + I_y^2 > 0)$ $$I_{TV} = I_x^2[I(0, 1) + I(0, -1) - 2 \times I(0, 0)] +$$

-continued
$$I_y^2[I(1, 0) + I(-1, 0) - 2 \times I(0, 0)] -$$
$$I_x I_y[I(-1, -1) + I(1, 1) - I(-1, 1) - I(-1, 1)]/2$$

else $$I_{TV} = 0$$

where the I in Equation 15 is interpreted as the image sample of the motion vector field from the raw optical flow field estimation, subsequent to the aforementioned non-linear processing. The advantage of this approach is that it allows the use of nonlinear statistical operations (such as a median) along with the L2 norm total-variation constraint as separable, post-processing steps from the optical flow field evaluation-proper, thereby allowing further opportunities for execution parallelism.

Figure 5:
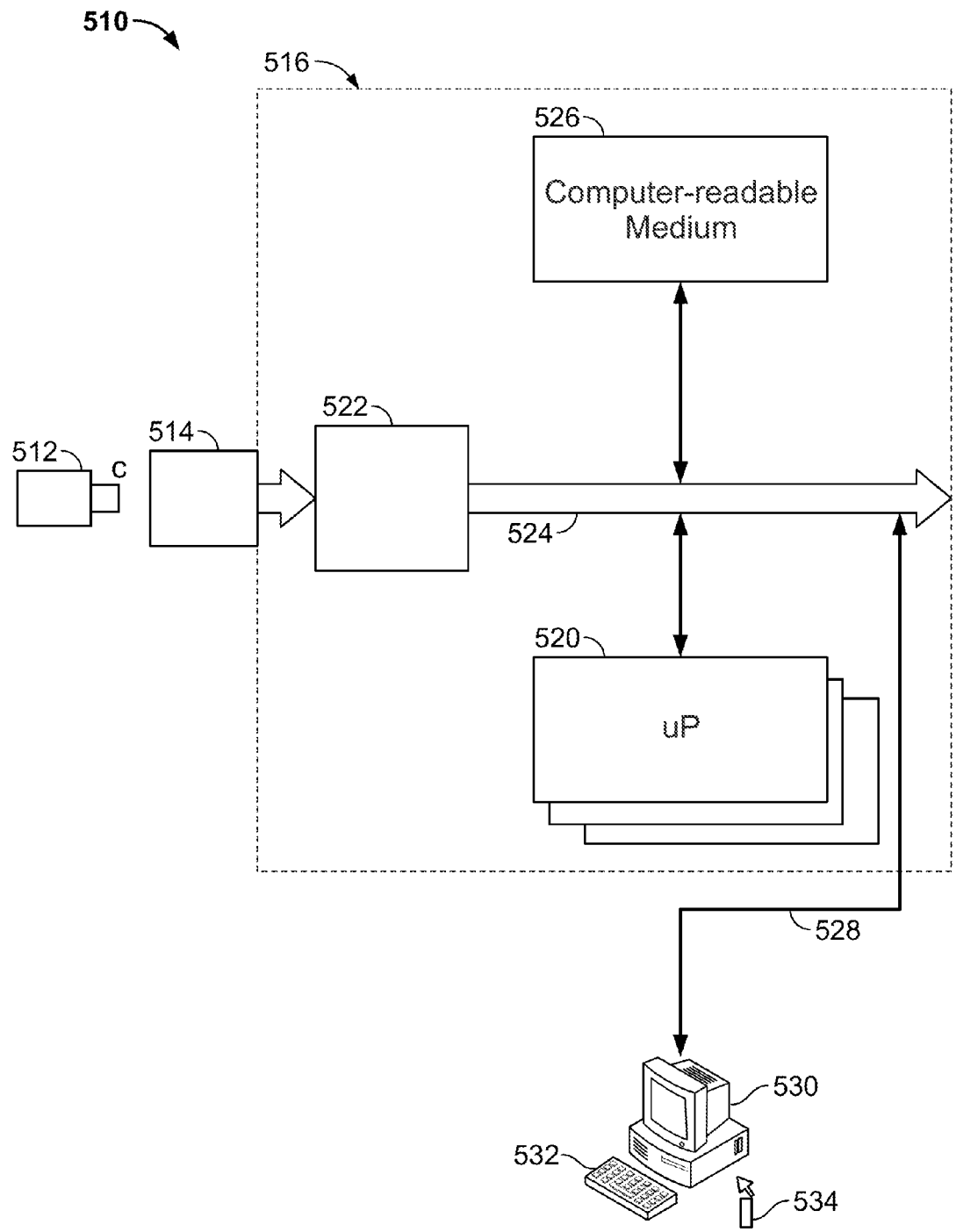
FIG. 5 depicts a system for computing an optical flow field between a pair of images, according to an embodiment of the present invention.

FIG. 5 depicts a system for computing an optical flow field between a pair of images, according to an embodiment of the present invention. By way of a non-limiting example, the system 510 receives digitized video or still images from one or more image capturing devices 512, such as one or more still or video cameras. The system 510 may also include a digital video capture system 514 and a computing platform 516. The digital video capturing system 514 processes streams of digital video, or converts analog video to digital video, to a form which can be processed by the computing platform 516. The digital video capturing system 514 may be stand-alone hardware, or cards such as Firewire cards which can plug-in directly to the computing platform 516. According to an embodiment of the present invention, the image capturing devices 512 may interface with the video capturing system 514/computing platform 516 over a heterogeneous data link, such as a radio link (e.g., between an aircraft and a ground station) and digital data link (e.g., Ethernet, between the ground station and the computing platform 516). The computing platform 516 may include a personal computer or work-station (e.g., a Pentium-M 1.8 GHz PC-104 or higher) comprising one or more processors 520 which includes a bus system 522 which is fed by video data streams 524 via the one or more processors 520 or directly to a computer-readable medium 526. Alternatively, the computing platform 516 may be implemented as or part of an integrated circuit, such as a graphics processing unit (GPU) or digital signal processor (DSP) implemented in an FPGA or ASIC.

The computer readable medium 526 may also be used for storing the instructions of the system 510 to be executed by the one or more processors 520, including an optional operating system, such as the Windows or the Linux operating system. The computer readable medium 526 may further be used for the storing and retrieval of video clips of the present invention in one or more databases. The computer readable medium 526 may include a combination of volatile memory, such as RAM memory, and non-volatile memory, such as flash memory, optical disk(s), and/or hard disk(s). Portions of a processed video data stream 528 may be stored temporarily in the computer readable medium 526 for later output to a monitor 530. The monitor 530 may display processed video data stream/still images. The monitor 530 may be equipped with a keyboard 532 and a mouse 534 for selecting objects of interest by an analyst.

The present invention has several advantages over prior art methods of computing optical flow. An accurate, dense, optical flow field is generated without major artifacts and impairments, even under severe conditions of stationary and non-stationary noise present in the input images. The process is efficient enough to perform in greater-than-real-time for standard definition and high-definition broadcast resolution video at 30 fps on contemporaneous, commercial, mass-marketed computer hardware, which opens up new applications for dense optical flow, including improved video coder efficiency, superresolution-based scaling, motion-compensated deinterlacing and framerate conversion, depth-map estimation, and object segmentation for real-time scene analysis, photogrammetry, and metrography.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for determining an optical flow field between a pair of images, comprising the steps of:
   (a) decomposing each of the pair of images into image pyramids;
   (b) transforming the pair of decomposed images at a first pyramid scale to second derivative representations under an assumption that a brightness gradient of pixels in the pair of decomposed images is constant;
   (c) estimating discrete-time derivatives of the second derivative image representations;
   (d) applying an optical flow estimation process to the discrete-time derivatives to produce a raw optical flow field;
   (e) scaling the raw optical flow field; and
   (f) repeating steps (b)-(e) for the pair of images at another pyramid scale until all pyramid scales have been visited to produce a final optical flow field, wherein each of the pair of decomposed images of step (b) is warped by using the motion vectors estimated in a previously scaled optical flow estimation.

2. The method of claim 1, further comprising the step of (g) transforming the second derivative image representations from color-space to a scalar color-distance space.

3. The method of claim 2, wherein step (g) is implemented using the Laplacian of the vector subtraction of color-distances.

4. The method of claim 3, wherein the Laplacian operator is applied to intensities of all color channels of the second-derivative image representations separately.

5. The method of claim 1, further comprising employing a pre-scaling step via bilinear interpolation to ensure that the highest resolution pyramid scale devolves to integer image sizes of (W',H'), wherein W' and H' are given by $$W'=\text{floor}(W/N) \times \text{pyramid\_factor}^N$$

$$H'=\text{floor}(W/N) \times \text{pyramid\_factor}^N.$$

6. The method of claim 1, wherein the first pyramid scale is the lowest resolution pyramid scale and another pyramid scale is next higher resolution pyramid scale.

7. The method of claim 1, wherein step (c) is accomplished using a spatiotemporal gradient estimation method.

8. The method of claim 1, wherein the optical flow estimation process employs a least-squares-fit method.

9. The method of claim 1, further comprising the step of processing the raw optical flow field with at least one non-linear filter that imposes a non-linear, piecewise-linearity constraint on the optical flow field.

10. The method of claim 9, wherein the at least one non-linear filter is at least one of a total variation minimization (L1 and L2 norm) filter, an anisotropic diffusion filter, an elliptic steerable filter that reacts to local image structures, and a kernel regression filter.

11. The method of claim 1, further comprising the steps of performing multiple-pixel motion-compensation and a sum-of-square-differences calculation on the raw optical flow field to check inverse consistency of the raw optical flow field on a per-pixel-sample basis.

12. The method of claim 1, further comprising the step of applying a 2D structure tensor eigensystem analysis to the discrete-time derivatives to provide a feedback mechanism for selecting a pyramid scaling factor at subsequent lower resolution pyramid scales.

13. The method of claim 12, wherein when small eigenvalues below a threshold percentage of pixels for a single pyramid scale in excess of other pyramid scales is encountered during the 2D structure tensor eigensystem analysis, a finer pyramid scale is used for at least one of the subsequent pyramid scales.

14. The method of claim 1, wherein the raw optical field flow is processed in reverse order.

15. The method of claim 14, wherein a motion vector is used to sample the second image of the pair of images in five or more locations of a Robert's Cross configuration.

16. The method of claim 1, further comprising the steps of processing the raw optical flow field for all pyramid scales by a (non-linear) 3×3 median filter operation to eliminate single-pixel outliers and processing the filtered raw optical flow field with an L2 norm total variation operator for a variable number of iterations.

17. A non-transitory computer-readable storage medium including instructions that, when accessed by a processing system, cause the processing system to perform operations comprising:
   (a) decomposing each of a pair of images into image pyramids;
   (b) transforming the pair of decomposed images at a first pyramid scale to second derivative representations under an assumption that a brightness gradient of pixels in the pair of decomposed images is constant;
   (c) estimating discrete-time derivatives of the second derivative image representations;
   (d) applying an optical flow estimation process to the discrete-time derivatives to produce a raw optical flow field;
   (e) scaling the raw optical flow field; and
   (f) repeating steps (b)-(e) for the pair of images at another pyramid scale until all pyramid scales have been visited to produce a final optical flow field, wherein each of the pair of decomposed images of step (b) is warped by using the motion vectors estimated in a previously scaled optical flow estimation.

18. A method for determining an optical flow field between a pair of images, comprising the steps of:
   (a) decomposing each of the pair of images into image pyramids;
   (b) transforming the pair of decomposed images at a first pyramid scale to second derivative representations under an assumption that a brightness gradient of pixels in the pair of decomposed images is constant;
   (c) estimating discrete-time derivatives of the second derivative image representations;
   (d) applying an optical flow estimation process to the discrete-time derivatives to produce a raw optical flow field;
   (e) scaling the raw optical flow field; and (f) repeating steps (b)-(e) for the pair of images at another pyramid scale until all pyramid scales have been visited to produce a final optical flow field, wherein each of the pair of decomposed images of step (b) is motion compensated by using motion vectors estimated in a previously scaled optical flow estimation.

19. The method of claim 18, further comprising the step of (g) transforming the second derivative image representations from color-space to a scalar color-distance space.

20. The method of claim 19, wherein step (g) is implemented using the Laplacian of the vector subtraction of color-distances.

21. The method of claim 20, wherein the Laplacian operator is applied to intensities of all color channels of the second-derivative image representations separately.

22. The method of claim 18, further comprising employing a pre-scaling step via bilinear interpolation to ensure that the highest resolution pyramid scale devolves to integer image sizes of (W',H'), wherein W' and H' are given by $$W'=\text{floor}(W/N)\times \text{pyramid\_factor}^N$$

$$H'=\text{floor}(W/N)\times \text{pyramid\_factor}^N.$$

23. The method of claim 18, wherein the first pyramid scale is the lowest resolution pyramid scale and another pyramid scale is next higher resolution pyramid scale.

24. The method of claim 18, wherein step (c) is accomplished using a spatiotemporal gradient estimation method.

25. The method of claim 18, wherein the optical flow estimation process employs a least-squares-fit method.

26. The method of claim 18, further comprising the step of processing the raw optical flow field with at least one non-linear filter that imposes a non-linear, piecewise-linearity constraint on the optical flow field.

27. The method of claim 26, wherein the at least one non-linear filter is at least one of a total variation minimization (L1 and L2 norm) filter, an anisotropic diffusion filter, an elliptic steerable filter that reacts to local image structures, and a kernel regression filter.

28. The method of claim 18, further comprising the steps of performing multiple-pixel motion-compensation and a sum-of-square-differences calculation on the raw optical flow field to check inverse consistency of the raw optical flow field on a per-pixel-sample basis.

29. The method of claim 18, further comprising the step of applying a 2D structure tensor eigensystem analysis to the discrete-time derivatives to provide a feedback mechanism for selecting a pyramid scaling factor at subsequent lower resolution pyramid scales.

30. The method of claim 29, wherein when small eigenvalues below a threshold percentage of pixels for a single pyramid scale in excess of other pyramid scales is encountered during the 2D structure tensor eigensystem analysis, a finer pyramid scale is used for at least one of the subsequent pyramid scales.

31. The method of claim 18, wherein the raw optical field flow is processed in reverse order.

32. The method of claim 31, wherein a motion vector is used to sample the second image of the pair of images in five or more locations of a Robert's Cross configuration.

33. The method of claim 18, further comprising the steps of processing the raw optical flow field for all pyramid scales by a (non-linear) 3×3 median filter operation to eliminate single-pixel outliers and processing the filtered raw optical flow field with an L2 norm total variation operator for a variable number of iterations.

34. A non-transitory computer-readable storage medium including instructions that, when accessed by a processing system, cause the processing system to perform operations comprising:
(a) decomposing each of a pair of images into image pyramids;
(b) transforming the pair of decomposed images at a first pyramid scale to second derivative representations under an assumption that a brightness gradient of pixels in the pair of decomposed images is constant;
(c) estimating discrete-time derivatives of the second derivative image representations;
(d) applying an optical flow estimation process to the discrete-time derivatives to produce a raw optical flow field;
(e) scaling the raw optical flow field; and
(f) repeating steps (b)-(e) for the pair of images at another pyramid scale until all pyramid scales have been visited to produce a final optical flow field, wherein each of the pair of decomposed images of step (b) is motion compensated by using motion vectors estimated in a previously scaled optical flow estimation.

* * * * *